United States Patent
Berjot et al.

(10) Patent No.: US 11,518,532 B2
(45) Date of Patent: Dec. 6, 2022

(54) REAR ENGINE ATTACHMENT OF AN AIRCRAFT HAVING TWO-PART RODS AND AIRCRAFT COMPRISING AT LEAST ONE SUCH REAR ENGINE ATTACHMENT

(71) Applicant: Airbus Operations SAS, Toulouse (FR)

(72) Inventors: Michael Berjot, Colomiers (FR); Jean Geliot, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 458 days.

(21) Appl. No.: 16/827,008

(22) Filed: Mar. 23, 2020

(65) Prior Publication Data

US 2020/0307816 A1 Oct. 1, 2020

(30) Foreign Application Priority Data

Mar. 25, 2019 (FR) ...................... 1903067

(51) Int. Cl.
  *B64D 27/26* (2006.01)
  *B64F 5/10* (2017.01)
(52) U.S. Cl.
  CPC ............. *B64D 27/26* (2013.01); *B64F 5/10* (2017.01); *B64D 2027/268* (2013.01)
(58) Field of Classification Search
  CPC .................. B64D 27/26; B64D 2027/266
  See application file for complete search history.

(56) References Cited

U.S. PATENT DOCUMENTS

| 4,742,975 | A | 5/1988 | Pachomoff et al. |
| 2012/0018576 | A1 | 1/2012 | Bonnet et al. |
| 2016/0122029 | A1 | 5/2016 | Serra et al. |

FOREIGN PATENT DOCUMENTS

| EP | 0249553 A1 | 12/1987 |
| EP | 2410202 A1 | 1/2012 |
| EP | 3015368 A1 | 5/2016 |

OTHER PUBLICATIONS

French Search Report; priority document.

*Primary Examiner* — Nicholas McFall
*Assistant Examiner* — Terri L Filosi
(74) *Attorney, Agent, or Firm* — Greer, Burns & Crain, Ltd.

(57) ABSTRACT

An aircraft rear engine attachment connecting a primary structure of a pylon and an engine of an aircraft. The rear engine attachment includes first and second rods, each of them including at least two parts, a first part including at least one support orifice, accommodating a support link bar, configured to connect the rod directly or indirectly to the primary structure, at least one second part including at least one engine orifice, accommodating an engine link bar, configured to connect the rod directly or indirectly to the engine, and also detachable link elements for connecting the first and second parts oriented parallel to the direction of the rod.

10 Claims, 4 Drawing Sheets

REAR ENGINE ATTACHMENT OF AN AIRCRAFT HAVING TWO-PART RODS AND AIRCRAFT COMPRISING AT LEAST ONE SUCH REAR ENGINE ATTACHMENT

CROSS-REFERENCES TO RELATED APPLICATIONS

This application claims the benefit of the French patent application No. 1903067 filed on Mar. 25, 2019, the entire disclosures of which are incorporated herein by way of reference.

FIELD OF THE INVENTION

The present application relates to a rear engine attachment of an aircraft having two-part rods and also to an aircraft comprising at least one such rear engine attachment.

BACKGROUND OF THE INVENTION

According to one embodiment visible in FIGS. 1 and 2, an aircraft 10 comprises a plurality of propulsion units 12 positioned under each of the wings 14 of the aircraft. Each propulsion unit 12 comprises an engine 16, a nacelle (not shown in FIG. 2) positioned around the engine 16 and a pylon 18 connecting the engine 16 and the wing 14. The pylon 18 comprises a primary structure 20 that is connected to the engine 16 by an engine attachment 22 and to the wing 14 by a wing attachment 24.

In the case of the present invention, a longitudinal direction is substantially parallel to the axis A16 of rotation of the engine. A vertical longitudinal plane is a vertical plane passing via the axis A16 of rotation of the engine. A transverse plane is a plane perpendicular to the axis A16 of rotation of the engine. A horizontal transverse direction is a horizontal direction perpendicular to the axis A16 of rotation of the engine.

The engine attachment 22 comprises a front engine attachment 26, a rear engine attachment 28 and a pair of thrust rods 30 that take up thrust forces.

According to one embodiment visible in FIG. 3, for the rear engine attachment 28, the primary structure 20 comprises a soleplate 32 positioned approximately in a horizontal plane. The rear engine attachment 28 comprises a transverse beam 34, connected to the primary structure 20 by vertical link elements 36 and to the engine 16 by a central engine link bar 38, a first rod 40 connected to the engine 16 by a first lateral engine link bar 42 and to the transverse beam 34 by two beam link bars 44 and also a second rod 46 connected to the engine by a second lateral engine link bar 48 and to the transverse beam 34 by a beam link bar 50. The link bars 42, 44, 48, 50 are substantially parallel to one another and to the longitudinal direction. According to one configuration, the soleplate 32 has shear pins projecting from the soleplate 32 which are configured such as to be accommodated in housings provided in the region of the rear engine attachment 28.

According to a first operating method, a method of mounting the engine 16 comprises a first step of fixing the rear engine attachment 28 onto the engine 16, a second, contacting step aimed at raising the unit formed by the engine 16 and the rear engine attachment 28 until the rear engine attachment 28 comes into contact against the soleplate 32 of the primary structure 20, the shear pins provided in the region of the primary structure 20 being positioned in their housings, and also a third step of fitting and tightening the vertical link elements 36 in order to connect the rear engine attachment 28 and the primary structure 20.

This solution is unsatisfactory because it leads to considerable bulk in a horizontal transverse direction, which has an impact on the aerodynamic nature of the pylon 18.

According to a second operating method, a method of mounting the engine 16 comprises a first step of fixing the engine attachment 28 onto the primary structure 20, a second, contacting step aimed at raising the engine 16 and also a third step of fitting the central engine link bar 38 and the first and second lateral engine link bars 42, 48. According to this second operating method, the engine link bars 38, 42, 48 are removed first at the time of dismantling.

This solution is unsatisfactory because the dismantling operation may prove to be difficult owing to engine link bar 38, 42, 48 binding phenomena.

Document EP249553 describes a rear engine attachment that comprises three suspension rods connecting the engine and the pylon. Each rod comprises a first part connected to the pylon by a first link bar, a second part connected to the engine by a second link bar and also a swivel joint connecting the first and second parts so that the rod is able to compensate for any expansion in the longitudinal direction experienced by the engine while it is functioning. To that end, the first part of each rod comprises two branches between which the second part of the rod is positioned, and the two parts of each rod are connected by a link element that has an axis perpendicular to the direction of the rod, this latter being parallel to a straight line connecting the first and second link bars. This orientation of the link elements is necessary in order to compensate for any expansions in the longitudinal direction experienced by the engine. According to this configuration, the link elements connecting the first and second parts of the rods work in shear.

SUMMARY OF THE INVENTION

The present invention aims to remedy all or some of the prior-art drawbacks.

To that end, the invention relates to an aircraft rear engine attachment connecting a primary structure of a pylon and an aircraft engine, the rear engine attachment comprising:

first and second rods, each of the first and second rods having at least one support orifice and at least one engine orifice, for each support orifice, a support link bar, which is accommodated in the support orifice and configured such as to connect the rod directly or indirectly to the primary structure, for each engine orifice, an engine link bar, which is accommodated in the engine orifice and configured such as to connect the rod directly or indirectly to the engine, the support and engine link bars being parallel to one another, each of the first and second rods having a rod direction parallel to a straight line passing via the support link bar and via the engine link bar, each of the first and second rods comprising at least two parts, a first part comprising the support orifice(s), a second part comprising the engine orifice(s) and also detachable link elements for connecting the first and second parts.

According to the invention, the detachable link elements each have an axis approximately parallel to the rod direction.

This solution makes it possible to reduce the overall width of the rear engine attachment and thus to improve the aerodynamic performance levels of the pylon while optimizing compensation for stresses.

According to another feature, the detachable link elements are inclined relative to a vertical plane of symmetry of the engine link bars of the first and second rods.

According to another feature, the first part comprises a first mounting plate, which has a first contact face approximately perpendicular to the rod direction and first passage holes having axes approximately parallel to the rod direction, and also at least one first tab which has at least one support orifice. Furthermore, the second part comprises a second mounting plate which has a second contact face approximately perpendicular to the rod direction and second passage holes having axes approximately parallel to the rod direction, and also at least one second tab which has at least one engine orifice.

According to one configuration, the rear engine attachment comprises a support comprising at least one base, configured such as to be connected to the primary structure, and also a web produced as a single piece with the base, positioned in an approximately transverse plane. Furthermore, the first part of the rod comprises two first tabs, which are parallel and closely spaced, between which the sole web of the support is positioned.

According to another configuration, the rear engine attachment comprises a support comprising at least one base configured such as to be connected to the primary structure, and also two webs, produced as a single piece with the base which are parallel and closely spaced and positioned in approximately transverse planes. Furthermore, the first part of the rod comprises a sole first tab positioned between the two webs of the support.

According to one embodiment, the second part of the rod comprises two second tabs, which are parallel and closely spaced, between which a single lateral anchoring plate of the engine is positioned during functioning.

According to another embodiment, the second part of the rod comprises a single second tab positioned during operation between two lateral anchoring plates of the engine.

According to another feature, each of the first and second parts comprises at least one reinforcing bracket connecting the first or second mounting plate and the first or second tab.

The invention also relates to a method for assembling an aircraft engine connected to a primary structure of a pylon by a rear engine attachment according to one of the preceding features, characterized in that the method comprises a first step of fixing the first parts of the rods onto the primary structure and the second parts of the rods onto the engine, a second, contacting step during which the engine is raised until the first and second parts of each rod are in contact one against the other, and also a step of fitting the detachable link elements in such a manner as to connect the engine and the primary structure.

The invention also relates to an aircraft comprising at least one rear engine attachment according to one of the preceding features.

BRIEF DESCRIPTION OF THE DRAWINGS

Other features and advantages will become apparent from the following description of the invention, which is given solely by way of example, with reference to the appended drawings, in which.

DETAILED DESCRIPTION OF THE PREFERRED EMBODIMENTS

Figure 1:
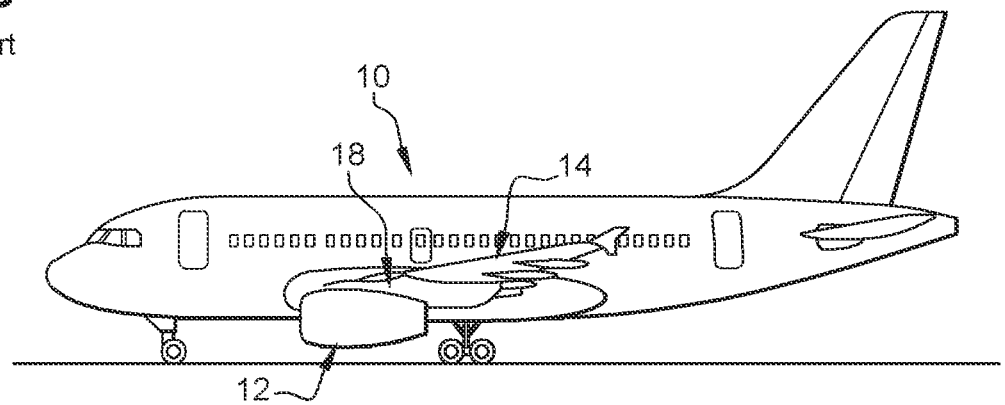
FIG. 1 is a lateral view of an aircraft.
Figure 2:
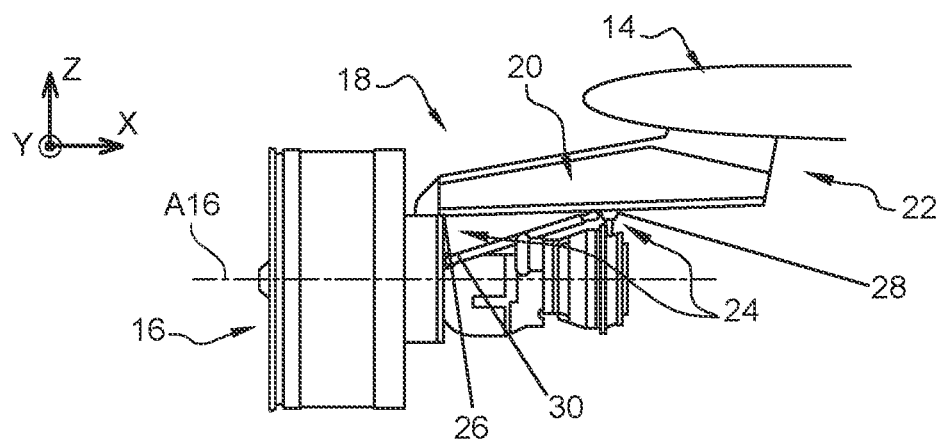
FIG. 2 is a lateral view of an engine system.
Figure 3:
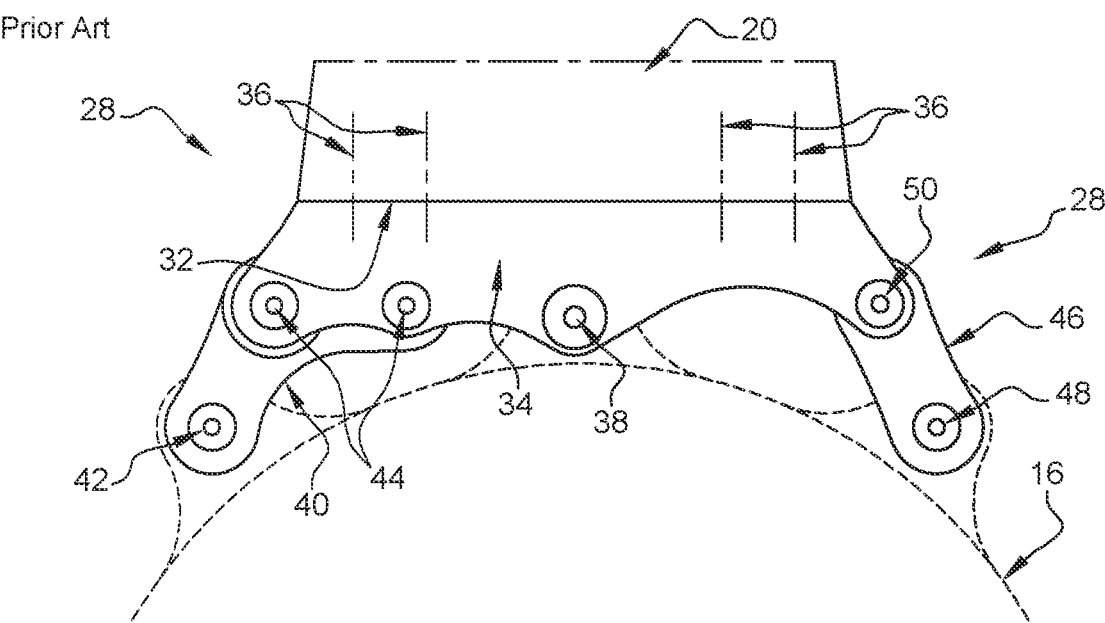
FIG. 3 is a front view of a rear engine attachment that illustrates a prior-art embodiment.
Figure 4:
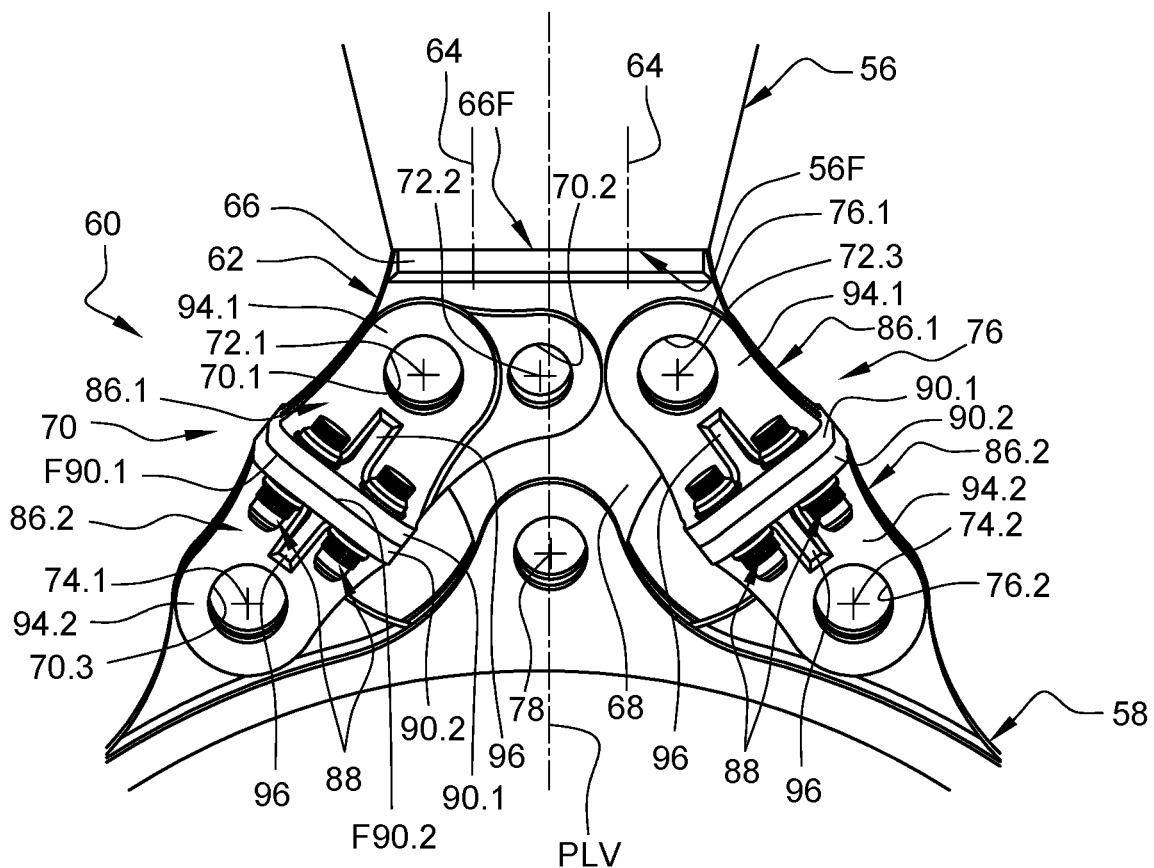
FIG. 4 is a front view of a rear engine attachment that illustrates an embodiment of the invention.
Figure 5:
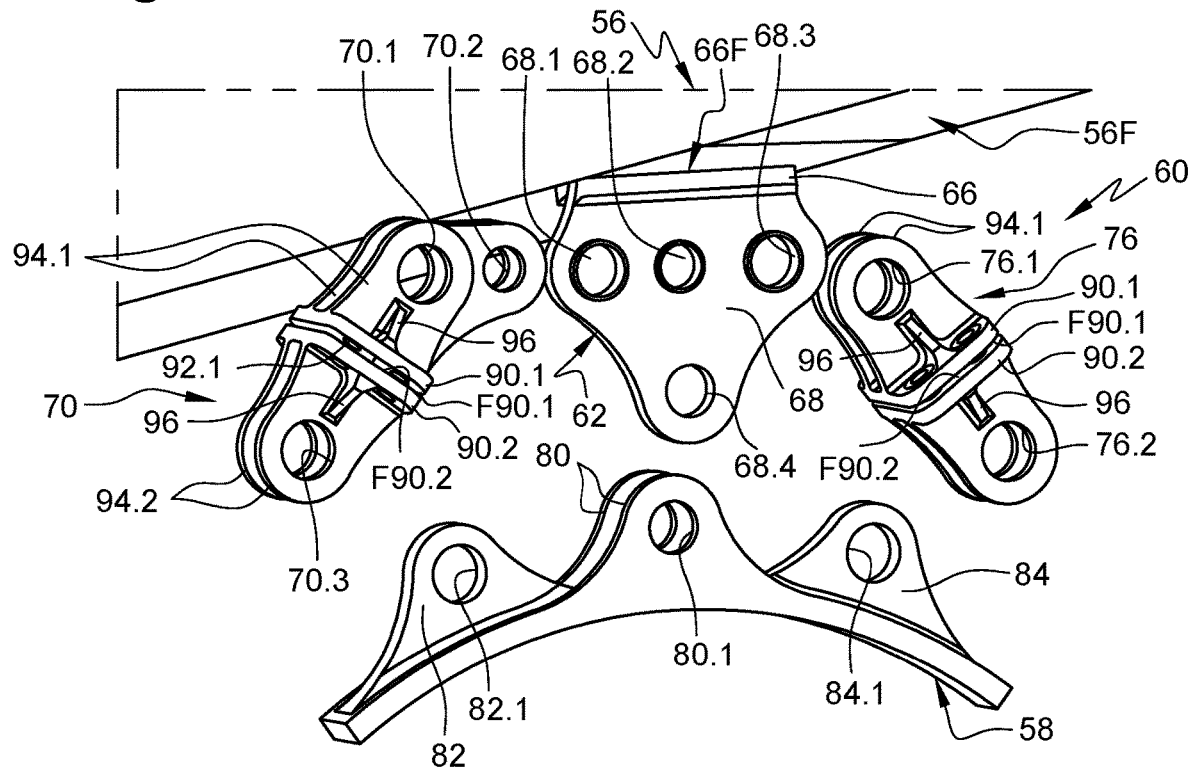
FIG. 5 is a perspective view of the rear engine attachment visible in FIG. 4 in the dismantled state.

FIGS. 4 to 8 show a primary structure 56 of an aircraft connected to an engine 58 by a rear engine attachment 60.

According to one configuration, the primary structure 56 comprises a substantially planar soleplate 56F for securing the rear engine attachment 60.

The rear engine attachment 60 comprises a support 62 connected to the primary structure 56 by vertical link elements 64 to the primary structure 56. This support 62 comprises at least one base 66 that has a bearing surface 66F placed against the soleplate 56F of the primary structure 56 and through-orifices for accommodating the link elements 64 and also at least one web 68, produced as a single piece with the base 66, positioned in an approximately transverse plane.

According to a first embodiment, the rear engine attachment 60 comprises at least a first rod 70, connected to the web 68 by first and second support link bars 72.1, 72.2 and to the engine 58 by a first lateral engine link bar 74.1, and also at least a second rod 76 connected to the web 68 by a third support link bar 72.3 and to the engine 58 by a second lateral engine link bar 74.2.

The first rod 70 has a first rod direction parallel to a first straight line connecting the first support link bar 72.1 and the first lateral engine link bar 74.1. The second rod 76 has a second rod direction parallel to a second straight line connecting the third support link bar 72.3 and the second lateral engine link bar 74.2. Thus, each of the rods has a rod direction parallel to a straight line passing via a support link bar connecting the rod and the support and via an engine link bar connecting the rod and the engine.

According to this embodiment, the support 62 is connected to the engine 58 by a central engine link bar 78. This bar, also called the "fail-safe" bar, is a standby safety bar that is under stress under normal conditions.

The first, second and third support link bars 72.1, 72.2, 72.3, the central engine link bar 78 and also the first and second lateral engine link bars 74.1, 74.2 are parallel to one another and oriented in a direction approximately parallel to the longitudinal direction. In order to simplify the figures, all these link bars 72.1, 72.2, 72.3, 78, 74.1, 74.2 are shown symbolically in the form of a cross.

The central engine link bar 78 is positioned in the region of the vertical longitudinal plane PLV. This plane PLV is vertical relative to the ground when the aircraft is on the ground and separates the engine into two approximately equal left and right parts. This vertical longitudinal PLV is a vertical plane of symmetry of the first and second lateral engine link bars 74.1, 74.2. The first, second and third support link bars 72.1, 72.2, 72.3 are aligned in a horizontal transverse direction. The second support link bar 72.2 is positioned between the first and third support link bars 72.1, 72.3.

The web 68 of the support 62 comprises first, second and third through-holes 68.1, 68.2, 68.3 respectively for the first, second and third support link bars 72.1, 72.2, 72.3 and also a fourth through-hole 68.4 for accommodating the central engine link bar 78. The first rod 70 comprises first and second orifices 70.1, 70.2 for accommodating the first and second support link bars 72.1, 72.2 and also a third orifice 70.3 for accommodating the lateral engine link bar 74.1. The second rod 76 comprises a first orifice 76.1 for accommodating the third support link bar 72.3 and also a second orifice 76.2 for accommodating the second lateral engine link bar 74.2.

The engine 58 comprises at least one central anchoring plate 80, positioned in a transverse plane, which has a through-hole 80.1 for accommodating the central engine link bar 78, at least a first lateral anchoring plate 82, positioned in a transverse plane, which has a through-hole 82.1 for accommodating the first lateral engine link bar 74.1, and also at least a second lateral anchoring plate 84, positioned in a transverse plane, which has a through-hole 84.1 for accommodating the second lateral engine link bar 74.2.

According to one configuration, the support link bars 72.1, 72.2, 72.3 and also the first and second lateral engine link bars 74.1, 74.2 each incorporate a swivel link for allowing deflection of the engine 58. The support link bars 72.1, 72.2, 72.3, the first and second lateral engine link bars 74.1, 74.2 and also the central engine link bar 78 are not described further as they may be identical to those of the prior art.

The invention is not limited to this embodiment. Thus, according to another embodiment, the support 62 might not be connected to the engine 58. Thus, the first rod 70 might comprise a fourth orifice for accommodating the central engine link bar 78. The second rod 76 might not be connected to the support 62 but to the first rod 70. According to another embodiment, the support 62 might be incorporated into the primary structure 56.

Irrespective of the embodiment, the rear engine attachment 60 comprises first and second rods 70, 76, each of them comprising at least one support orifice 70.1, 70.2, 76.1, for accommodating a support link bar 72.1, 72.2, 72.3, configured such as to connect the rod 70, 76 directly or indirectly to the primary structure 56 and also at least one engine orifice 70.3, 76.2, for accommodating an engine link bar 74.1, 74.2, 78, configured such as to connect the rod 70, 76 directly or indirectly to the engine 58; the support and engine link bars being parallel to one another.

Each rod 70, 76 comprises at least two parts 86.1, 86.2, a first part 86.1 comprising the support orifice(s) 70.1, 70.2, 76.1, configured such as to be connected directly or indirectly to the primary structure 56, and a second part 86.2, comprising the engine orifice(s) 74.1, 74.2, configured such as to be connected to the engine 58, and also detachable link elements 88 for connecting the first and second parts 86.1, 86.2.

According to one feature of the invention, the detachable link elements 88 are oriented in such a manner as to work in traction and not in shear. Thus, they each have an axis approximately parallel to the rod direction. This configuration makes it possible to optimize stress compensation.

According to one embodiment, the first part 86.1 comprises a first mounting plate 90.1, which has a first contact face F90.1 and first through-holes 92.1, and also at least a first tab 94.1 which has at least one support orifice 70.1, 70.2, 76.1. During functioning, the first contact face F90.1 of the first mounting plate 90.1 is approximately perpendicular to the rod direction and the first through-holes 92.1 have axes approximately parallel to the rod direction.

According to a first configuration, the support 62 comprises a single web 68 and the first part 86.1 of the rod 70, 76 comprises two first tabs 94.1, which are parallel and closely spaced, between which the single web 68 of the support 62 is positioned. When the support 62 comprises a single web 68, the engine 58 comprises two central anchoring plates 80, which are parallel and closely spaced, arranged on either side of the sole web 68.

According to a second configuration that is not shown, the first part 86.1 of the rod 70, 76 comprises a single first tab 94.1 and the support 62 comprises two webs 68, which are parallel and closely spaced, between which the sole first tab 94.1 is positioned. When the support 62 comprises two webs 68, the engine 58 comprises a sole central anchoring plate 80 positioned between the two webs 68.

According to one embodiment, the second part 86.2 comprises a second mounting plate 90.2, which has a second contact face F90.2 and second through-holes 92.2, and also at least a second tab 94.2 which has at least one engine orifice 70.3, 76.2. During functioning, the second contact face F90.2 is approximately perpendicular to the rod direction and the second through-holes 92.2 are approximately parallel to the rod direction.

According to a first configuration, the engine 58 comprises a single first or second lateral anchoring plate 82, 84 and the second part 86.2 of the rod 70, 76 comprises two second tabs 94.2, which are parallel and closely spaced, between which the sole lateral anchoring plate 82, 84 of the engine 58 is positioned.

According to a second configuration that is not shown, the second part 86.2 of the rod 70, 76 comprises a single second tab 94.2 and the engine 58 comprises two first or second lateral anchoring plates 82, 84, which are parallel and closely spaced, between which the sole second tab 94.2 is positioned.

Each of the first and second parts 86.1, 86.2 may comprise at least one reinforcing bracket 96 for connecting the first or second mounting plate 90.1, 90.2 and the first or second tab 94.1, 94.2.

Each mounting plate 90.1, 90.2 is in the form of a plate that has an approximately square or rectangular periphery, with rounded corners. According to one configuration, the first and second mounting plates 90.1 and 90.2 are symmetrical relative to a plane of contact (perpendicular to the rod direction) corresponding to the first and second contact faces F90.1, F90.2 when they are placed against one another.

According to one configuration, each mounting plate 90.1, 90.2 comprises four through-holes 92.1, 92.2 arranged on either side of the first or second tab(s) 94.1, 94.2. The first through-holes 92.1 of the first mounting plate 90.1 are arranged such as to be aligned with the second through-holes 92.2 of the second mounting plate 90.2 when the first and second mounting plates 90.1, 90.2 are placed against one another. At least one of the first and second mounting plates 90.1, 90.2 comprises at least one centering device for promoting the alignment of the first through-holes 94.1 of the first mounting plate 90.1 with the second through-holes 94.2 of the second mounting plate 90.2 at the time of a step of contacting the first and second mounting plates 90.1, 90.2.

According to one embodiment, the detachable link elements 88 are bolts equipped with braking systems aimed at preventing the bolts from loosening.

Figure 6:
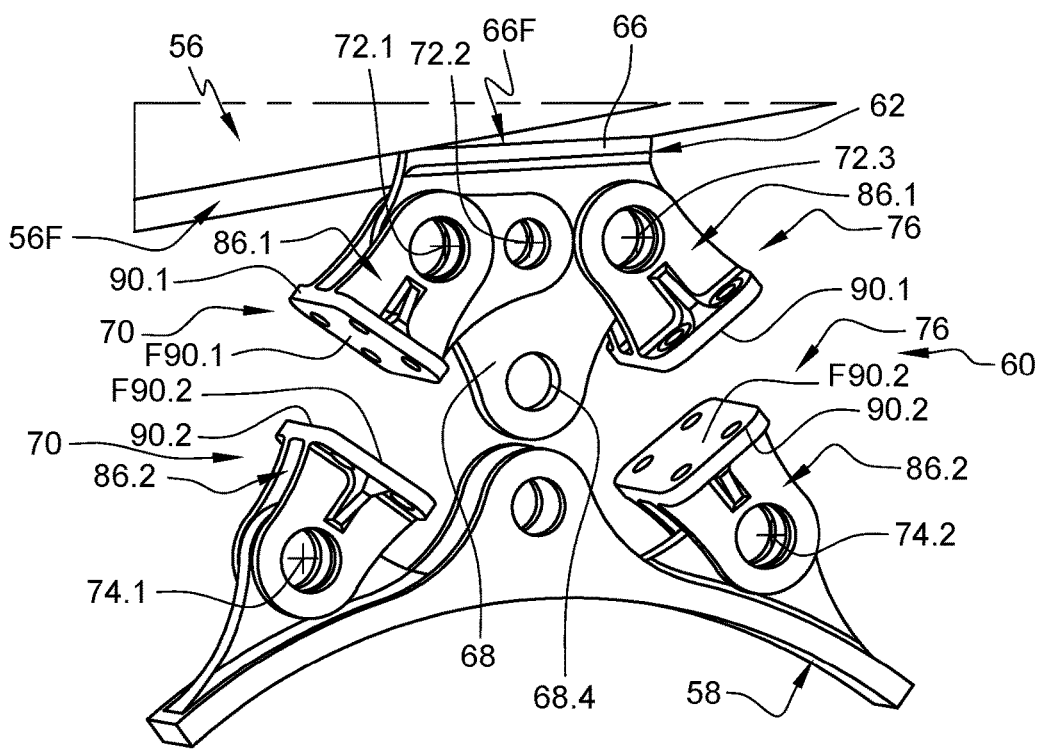
FIG. 6 is a perspective view of the rear engine attachment visible in FIG. 4 in the course of mounting, the first and second parts of each rod being in the spaced-apart state, one being connected to the primary structure and the other to an engine.
Figure 7:
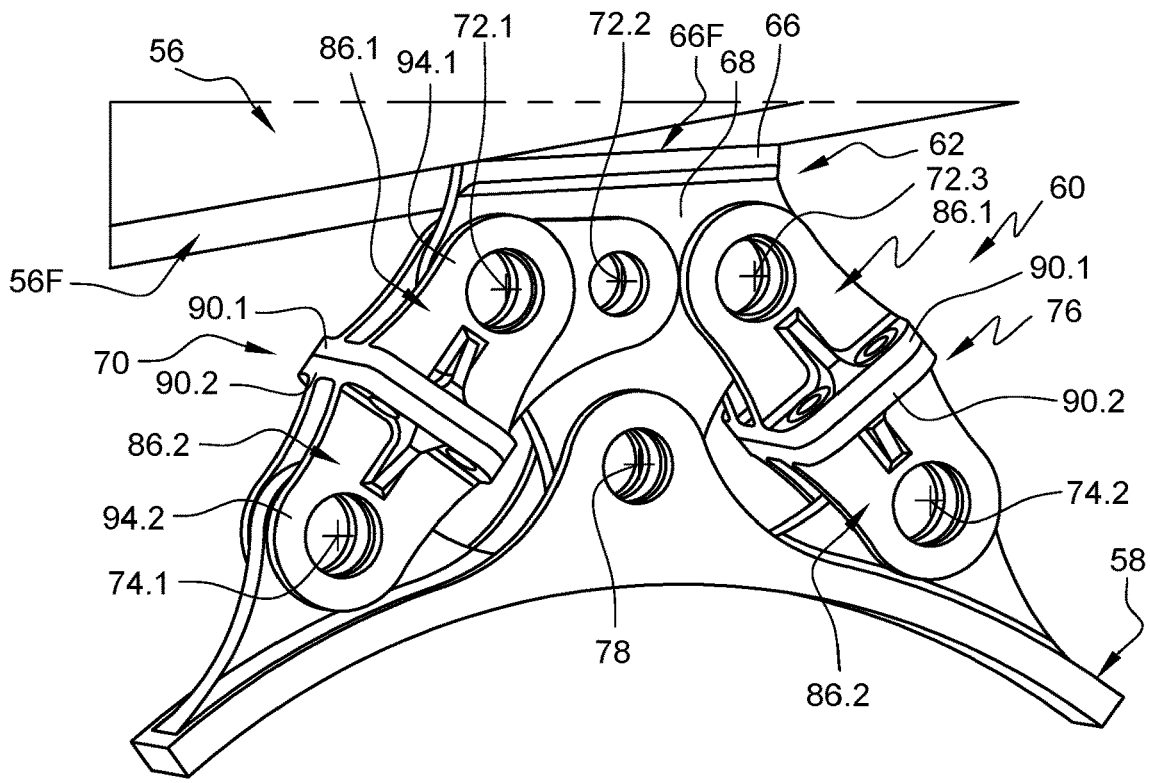
FIG. 7 is a perspective view of the rear engine attachment visible in FIG. 4 in the course of mounting, the first and second parts of each rod being in the contacted state.
Figure 8:
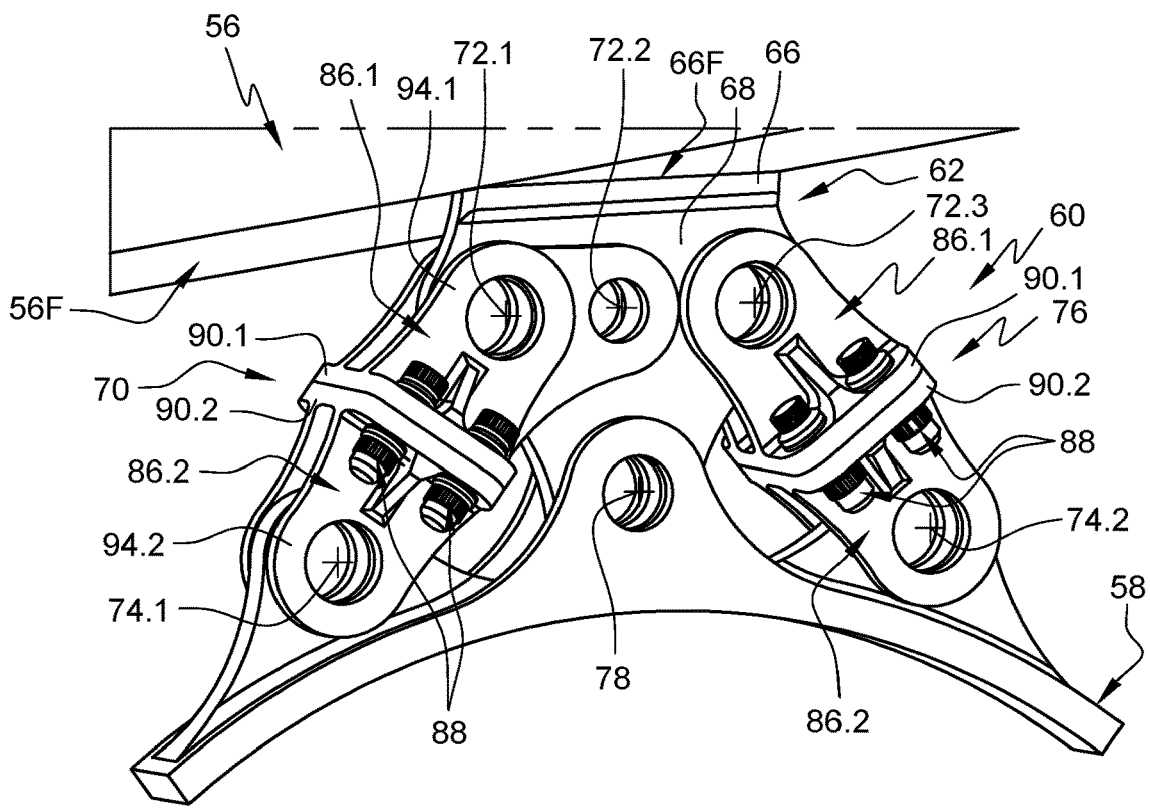
FIG. 8 is a perspective view of the rear engine attachment visible in FIG. 4, the first and second parts of each rod being in the connected state.

The method for mounting the engine 58 comprises a first step of fixing the support 62 and the first parts 86.1 of the rods 70, 76 onto the primary structure 56 and also the second parts 86.2 of the rods 70, 76 onto the engine 58, as illustrated in FIG. 6; a second, contacting step during which the engine 58 is raised until the first and second parts 86.1, 86.2 of each rod 70, 76 are in contact one against the other and the first and second through-holes 94.1, 94.2 are aligned, as illustrated in FIG. 7; and also a step of fitting the detachable link elements 88 in such a manner as to connect the engine 58 and the primary structure 56.

During detachment of the engine 58, only the detachable link elements 88 and the engine link bar 78 are removed in order to separate the engine 58 from the primary structure 56.

According to the invention, the engine orifices 70.3, 76.2 being more spaced from the vertical longitudinal plane PLV than the support orifices 70.1, 70.2, 76.1, the first and second mounting plates 90.1, 90.2 are inclined relative to the horizontal and the detachable link elements 88 are not vertical but inclined relative to the vertical longitudinal plane PLV. By way of indication, the detachable link elements 88 form an angle of between 30 and 60° with the vertical longitudinal plane PLV. This inclination makes the detachable link elements 88 easier to access. This improved accessibility makes it possible to reduce the overall width of the rear engine attachment 60 and thus to improve the aerodynamic performance levels of the pylon.

Lastly, these detachable link elements 88 in the form of bolts are less susceptible to binding phenomena than are the engine link bars.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft rear engine attachment connecting a primary structure of a pylon and an aircraft engine,
   the rear engine attachment comprising:
   first and second rods, each of the first and second rods having at least one support orifice and at least one engine orifice,
   for each support orifice, a support link bar, which is accommodated in the support orifice and configured such as to connect the rod directly or indirectly to the primary structure of the pylon,
   for each engine orifice, an engine link bar, which is accommodated in the engine orifice and configured such as to connect the rod directly or indirectly to the aircraft engine,
   the support and engine link bars being parallel to one another,
   each of the first and second rods having a rod direction parallel to a straight line passing via the support link bar and via the engine link bar,
   each of the first and second rods comprising at least two parts, a first part comprising the at least one support orifice, a second part comprising the at least one engine orifice and also detachable link elements for connecting the first and second parts,
   wherein the detachable link elements each have an axis parallel to the rod direction.

2. The aircraft rear engine attachment according to claim 1, wherein the detachable link elements are inclined relative to a vertical plane of symmetry of the engine link bars of the first and second rods.

3. The aircraft rear engine attachment according to claim 1, wherein the first part comprises a first mounting plate, which has a first contact face perpendicular to the rod direction and first passage holes having axes parallel to the rod direction, and also at least one first tab which has at least one support orifice, and wherein the second part comprises a second mounting plate which has a second contact face perpendicular to the rod direction and second passage holes having axes parallel to the rod direction, and also at least one second tab which has at least one engine orifice.

4. The aircraft rear engine attachment according to claim 3, wherein the rear engine attachment comprises a support comprising at least one base, configured to be connected to the primary structure of the pylon, and also a sole web produced as a single piece with the base, positioned in a transverse plane, and wherein the first part of the rod comprises two first tabs, which are parallel and closely spaced, between which the sole web of the support is positioned.

5. The aircraft rear engine attachment according to claim 3, wherein the rear engine attachment comprises a support comprising at least one base configured such as to be connected to the primary structure of the pylon, and also two webs, produced as a single piece with the base which are parallel and closely spaced and positioned in transverse planes, and wherein the first part of the rod comprises a sole first tab positioned between the two webs of the support.

6. The aircraft rear engine attachment according to claim 3, wherein the second part of the rod comprises two second tabs, which are parallel and closely spaced, between which a single lateral anchoring plate of the aircraft engine is positioned during functioning.

7. The aircraft rear engine attachment according to claim 3, wherein the second part of the rod comprises a single second tab positioned during operation between two lateral anchoring plates of the aircraft engine.

8. The aircraft rear engine attachment according to claim 3, wherein each of the first and second parts comprises at least one reinforcing bracket connecting the first or second mounting plate and the first or second tab.

9. A method for assembling an aircraft engine connected to a primary structure of a pylon by a rear engine attachment according to claim 1, wherein the method comprises:
   a first step of fixing the first parts of the rods onto the primary structure of the pylon and the second parts of the rods onto the aircraft engine,
   a second, contacting step during which the aircraft engine is raised until the first and second parts of each rod are in contact one against the other, and
   a step of fitting the detachable link elements in such a manner as to connect the aircraft engine and the primary structure of the pylon.

10. An aircraft comprising at least one rear engine attachment according to claim 1.

* * * * *